Sept. 19, 1944.   L. V. LUCIA   2,358,766
AUTOMATIC TOASTER
Filed Feb. 23, 1939   2 Sheets-Sheet 1

Inventor
Louis V. Lucia

Sept. 19, 1944.   L. V. LUCIA   2,358,766
AUTOMATIC TOASTER
Filed Feb. 23, 1939   2 Sheets-Sheet 2
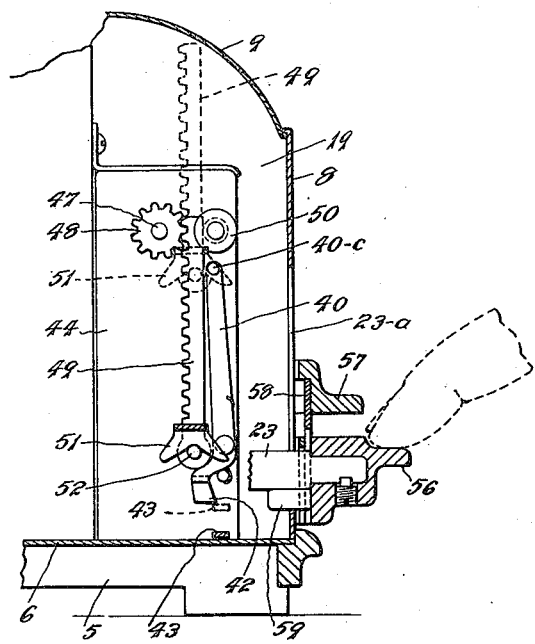
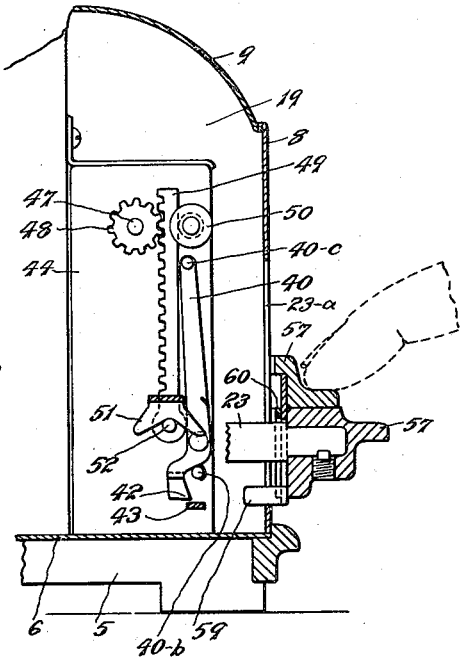
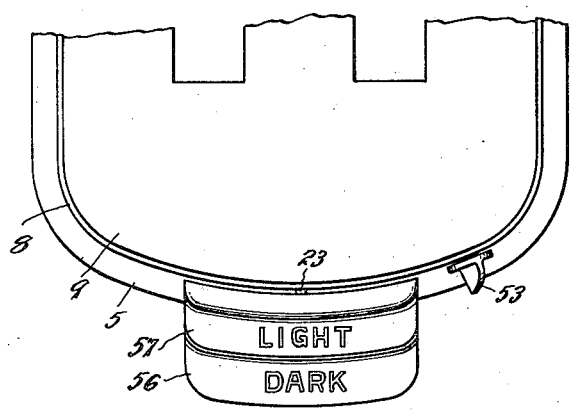
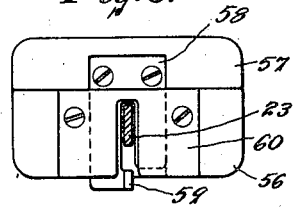
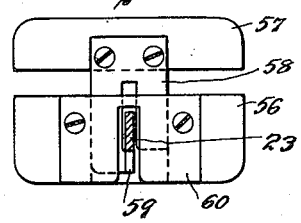
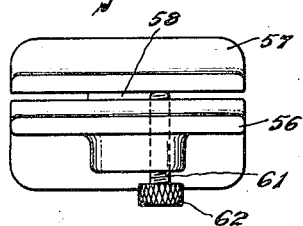
Inventor
Louis V. Lucia Patented Sept. 19, 1944

2,358,766

UNITED STATES PATENT OFFICE 2,358,766

AUTOMATIC TOASTER

Louis V. Lucia, West Hartford, Conn.

Application February 23, 1939, Serial No. 257,936

10 Claims. (Cl. 99—327)

This invention relates to automatic toasters and more particularly to that type in which the toasting operation is automatically controlled, by thermally responsive means, to vary the length of the time period allowed for the toasting operation, in proportion to the heat of the toaster, so that slices may be uniformly toasted in each operation of the toaster.

Such toasters, for which my invention is particularly adapted, are clearly shown and described in United States Patents No. 2,039,956, May 5, 1936 to M. H. Graham, No. 2,077,627, April 20, 1937, to M. Ireland, No. 2,138,674, November 29, 1938, to M. H. Graham, No. 2,036,178, March 31, 1936, to L. V. Lucia, and others more recently issued.

It will be noted, from these patents, that thermally responsive device controls the operation of the toaster so as to vary the time period provided by a timing device, in proportion to the heat in the toaster, and thereby insure uniform toasting. Also, that each of the toasters shown in said patents is provided with means whereby the timing device may be permanently adjusted for the degree of toasting desired.

The said adjustment of the timing device is not intended to be disturbed when the toaster is toasting the bread slices to the proper degree, for the reason that it can only be made by, what may be termed, the set and try method which necessitates the toasting of several bread slices before the desired degree of toasting is obtained.

It has been found that while some persons prefer toast which is done to a certain degree, others prefer it done to a different degree or, in other words, some persons like dark toast while others like light toast.

Heretofore, no provision has been made whereby different types of toast, such as light or dark, may be obtained without disturbing the permanent adjustment of the toaster. While it is true that different kinds of toast may be obtained by changing the said permanent adjustment, this is not practical for the reason that this adjustment cannot be readily changed for different degrees of toasting since it is necessary to try several slices before the desired type of toast can be obtained.

Therefore, an object of my invention is to provide, for automatic toasters of the type shown in the above patents, means whereby the type of toast desired by different individuals may be selectively obtained, without disturbing the permanent adjustment of the toaster.

A further object of the invention is to provide means for automatic toasters whereby either a light or a dark slice of toast may be obtained by simply selecting and operating a single member to initiate the toasting operation of the toaster in accordance with the kind of toast desired.

A further object is to provide such means whereby the toaster may be operated to produce either a light or dark slice of toast uniformly and without requiring special adjustment each time that a different type of toast is desired.

The present invention differs from that illustrated in my co-pending application Serial No. 236,484, filed October 22, 1938, for Timing device, now Patent No. 2,293,741, inasmuch as this invention is to provide dark or light toast from a thermally controlled automatic toaster, while the invention in said co-pending application is for the purpose of providing a longer period to pre-heat automatic toasters which are not thermally controlled.

Further objects of my invention will be clearly understood from the following specification and from the accompanying drawings in which:

Figure 3 is a fragmentary view, in vertical section, illustrating the operation of my invention for obtaining a dark slice of toast.

Figure 4 is a similar view illustrating the operation for obtaining a light slice of toast.

Figure 5 is a plan view, in elevation, of a front portion of the toaster.

Figure 6 is a rear view, in elevation, of the operating handle assembly in its normal position.

Figure 7 is a similar view showing the position of the handles when operated as illustrated in Figure 3.

Figure 8 is a front view of the operating handles illustrating an additional element which may be added to my invention.

Figure 1:
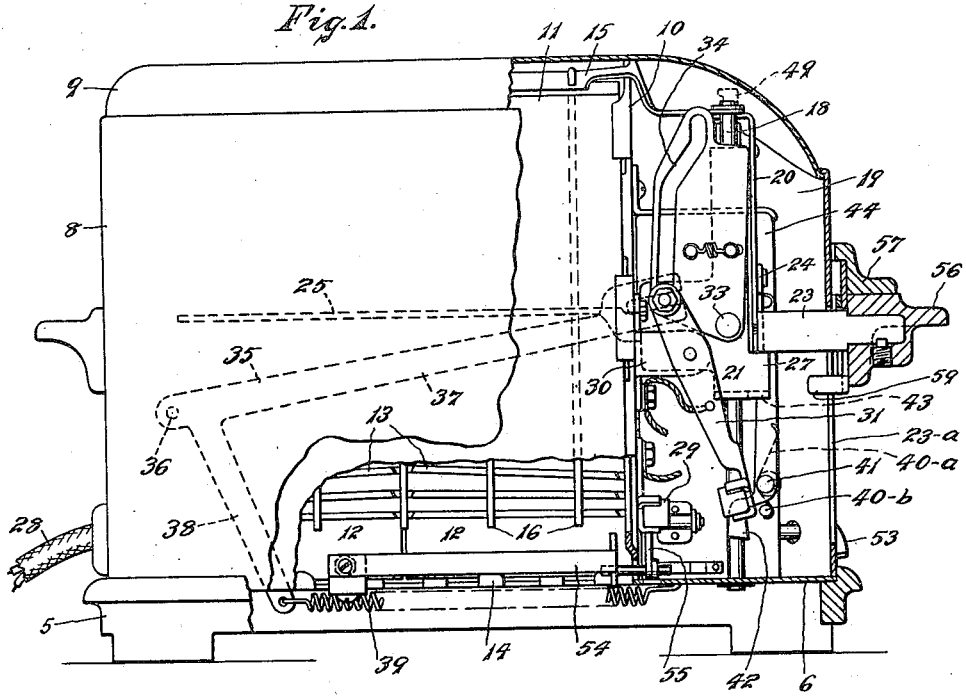
Figure 1 is a side view, in elevation, of an automatic toaster with parts broken away to show an embodiment of my invention.
Figure 2:
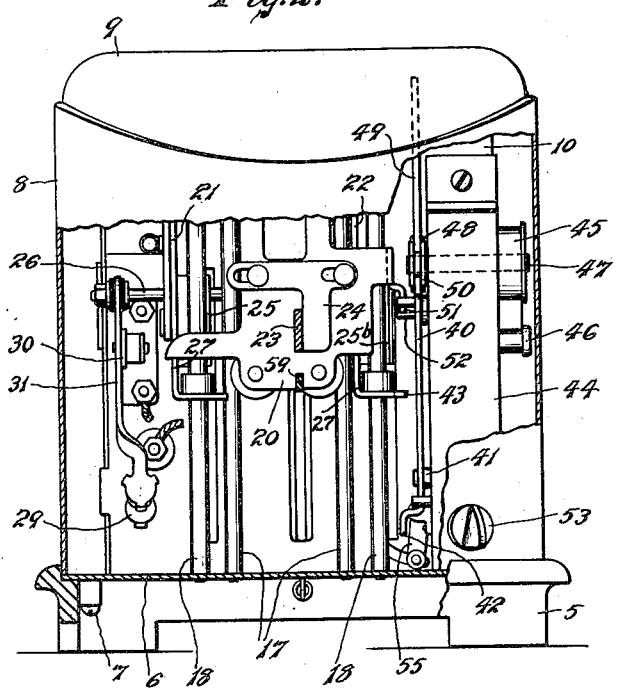
Figure 2 is a front view of the same, in elevation, with a portion of the casing broken away to show the mechanism.

In the embodiment of the invention here shown for the purpose of disclosure, there is illustrated an automatic toaster such as disclosed in the above cited patents and which comprises a toaster assembly of the vertical oven type which includes a skeleton base 5, preferably of molded material, and a base plate 6 which may be secured thereto by means of screws 7. The assembly includes a casing 8 which comprises the walls of the toaster and a cover 9 which may be connected to said casing.

The toaster includes a front intermediate wall 10 and intermediate side walls 11 which co-operate to define toasting chambers, within the casing 8, all in a manner which will be clearly understood from the above cited patents.

A pair of heating, or toasting elements are provided for each toasting chamber. Each heating element includes one or more sheets 12 of material, such as mica, upon which is mounted a resistor element 13. The said heating elements may be positioned, relative to the heating elements, by upstanding lugs 14 projecting from the base plate 6 and by depending flanges on the horizontally extending frame members 15, which support guard wires 16, as well known in the art.

The mechanism of the toaster assembly includes also a pair of inner vertical standards 17 and a pair of outer standards 18 which are positioned in a mechanism chamber 19 that is defined by the front intermediate wall 10 and the front wall of the casing 8. A carriage 20 is vertically movable on the standards 17 and is adapted to cause a slider 21, on the left hand standard 18, and a slider 22, on the right hand standard 18, to be moved downwardly by means of a handle bar 23 which extends forwardly, through a slot 23—a in the casing 8, from a member 24 which is mounted on the carriage 20.

Bread carriers 25—25b are mounted on the sliders 21 and 22 and are vertically movable between the respective pair of electric heating elements hereinbefore described. The said bread carriers are operatively connected by a rod 26 and are thereby secured to the respective sliders 21 and 22 so that downward pressure by an operator, on the bar 23, will cause downward movement of the member 24, the carriage 20, sliders 21 and 22 and therewith the bread carriers 25 and 25b. The said sliders each have extensions 27 which are engaged by the carriage 20 for moving them downwardly on the rods 18.

Means to control the supply of electric energy to the heating elements, through a conductor cord 28, include a circuit controlling switch comprising a fixed contact member 29 and a bracket 30, which are mounted on and insulated from the front intermediate wall 10, and an arm 31 which is pivotally mounted on said bracket 30. A member 32 is pivoted on the slider 21, as at 33, and has a cam slot 34 for operating the arm 31 to move into engagement with the contact 29 and thereby close the electric circuit co-incident with vertical movement of the carriage 20 and the sliders 21 and 22.

A bell crank lever 35 is pivoted in said toaster, as at 36, and comprises a substantially horizontally extending arm 37 and a depending arm 38. The end of the arm 37 is forked to receive the rod 26 and a helical spring 39 is connected, at one end to the said arm 38 and at its other end to a base 6, to exert a pull to rock the said lever and tend to raise the said sliders and carriage vertically, on the bars 17 and 18, and at the same time cause the member 32 to rock the arm 31 and thereby break the electrical circuit to terminate a toasting operation.

In order to retain the bread slice supports 25 in their lower, or toasting, position there is usually provided a latch 40 which may be pivotally mounted to the side of the clock mechanism, as at 41, and moved by means of the spring 40—a to detent engaging position, against a stop pin 40—b. The said latch has a point 42 that is adapted to engage a detent 43, which projects from the side of the slider 22, and thereby hold the bread carriers in their toasting position.

A timing device, indicated at 44 or other suitable timing or control means, is provided for operating the toaster to terminate the toasting operation, at the expiration of a predetermined period of time, by causing the said latch 40 to release the detent 43; thereby permitting the arm 35, under the tension of the spring 39, to return the sliders 21 and 22, and therewith the bread carriers 25—25b, to their normal position and at the same time permit the member 32 to operate the switch bar 30 so as to break the electrical circuit in the toaster and de-energize the heating elements.

In the embodiment shown, the said timing device preferably includes a main spring 45 which is mounted at one side of the timing device and anchored at 46. A shaft 47 is connected to said main spring, extends through the timing device and has a gear 48 thereon which meshes with a rack bar 49 that rotates said gear and winds the main spring 45 to set the timing mechanism in operation. The said rack bar 49 is held in engagement with the gear 48 by means of a retaining pulley 50 and an inverted V-shaped member 51 extends from the carriage 20 and engages a pin 52 which projects from the said rack.

The said timing device is adjustable, by means of a knob 53, to provide the proper length of time period before the operation of the latch 40 and thereby permit toasting of the bread slice to the desired degree.

The time period which is provided by the timing device, in accordance with the adjustment made by the knob 53, is variable by means of a thermostatic, or thermally responsive, member 54. This member is located in a position where it is exposed to the heat of the heating chamber so as to vary the said time period in proportion to the toasting temperature within the toaster and thereby maintaining a uniform degree of toasting on each successive bread slice.

The said thermostatic member operates the timing device, through a lever 55, in a manner which is clearly described in the Patent No. 2,077,627 to Ireland, above cited, and may be clearly understood therefrom.

The description hereinbefore given, has not been given to describe an automatic toaster in detail but merely for the purpose of having the objects of my present invention more clearly understood.

Although a particular type of automatic toaster has been illustrated and described; this is simply to illustrate one embodiment of my invention. It is to be understood, however, that the said invention may be used upon various other types of automatic toasters to obtain the same objects herein above set out.

The present invention will now be more specifically described. It will be noted that an operating handle 56 is mounted on the bar 23. This handle is for the purpose of pressing the said bar downwardly to carry therewith the carriage 20 and set the toaster for a toasting operation as above described.

In order to accomplish the objects of my invention, I provide another, or an auxiliary, handle 57 which is positioned preferably on top of the handle 56 and has a plate 58 secured thereto and extending downwardly therefrom. A stop 59 extends from said plate 58 into the slot 23—a in the casing 8, directly under and in line with the bar 23. The said handle 57 is retained in position by means of a plate 60 which is secured to the back of the handle 56 and retains the plate 58 slidably in a groove therein.

From the above description of automatic toasters such as shown in the patents cited, it will be understood that such toasters are permanently set, for the degree of toasting desired, by adjusting the timing device 44 with the adjusting knob 53 so as to provide the proper time period for the toasting operations. Also, that after a toaster has been thus adjusted, the thermally responsive member 54 will vary the time periods in proportion to the heat of the toaster and that once this adjustment has been made, the knob 53 is not intended to be disturbed. After the toaster has been thus adjusted, by means of the knob 53, the operation of my invention, to obtain either dark or light slices of toast, is as follows and may be clearly understood from Figures 3 and 4 of the drawings.

When a dark slice of toast is desired, the handle 56 is depressed as indicated in Figure 3. This will permit the bar 23 to be moved downwardly to a position at the limit of its downward movement wherein it will be stopped by the projection 59 which will engage the bottom of the slot 23—a. The said bar will move with it the carriage 20 and, through the member 51 thereon, the rack 49; thus winding the timing device to the maximum degree to provide the period of time required for a dark slice of toast.

It will be noted, from said Figure 3, that the operation of the handle 56 will carry, the detent 43, past the point 42 of the latch 40. When the handle 56 is released, the lever 35 will raise the sliders 21 and 22 until the detent 43 engages the said point 42 of the latch. The entire mechanism will then be retained, by the said latch, in its toasting position with the timing device running and under the influence of the thermostatic member 54.

During the running of the timing device, and the unwinding of the spring 45, the rack bar 49 will be moved slowly upwardly, by the gear 48, and it will carry therewith the carriage 20 and the member 51.

Just before the time period for the toasting operation has expired, the member 51 will engage the pin 40—c, on the latch 40, causing the said latch to release the detent 43 and permit the mechanism to be returned, by the lever 35, to its normal position; thereby raising the bread carriers 25—25b and operating the arm 30 to terminate the toasting operation as above described.

When a light slice of toast is desired, the toasting operation of the toaster in initiated by simply forcing downwardly on the handle 57 as illustrated in Figure 4. This will cause the toasting mechanism to be also operated through the bar 23, in the same manner as when the handle 56 is operated, moving the said bar downwardly until the extension 59 comes into contact with and stops against the bottom of the slot 23—a.

It will be noted that when the stid handle 57 is pushed downwardly and the extension 59 engages the bottom of the slot, the bar 23 will not travel as far as it does when it is operated by the handle 56 and as illustrated in Figure 3. This permits the pulling down of the rack 49 only to the position illustrated in Figure 4 in which it will have moved a lesser distance and thus wound the clock mechanism to operate for a shorter period of time since, when the handle 57 is released, the operation of the timing mechanism will begin from a point nearer to the position where the member 51 will cause the latch 40 to disengage the detent 43.

It will be seen from Figure 4 that when the said handle 57 is operated, the detent 43 will move past the point 42 of the latch but not as far as it does when the handle 56 is operated. Therefore, when the toaster is operated by means of the handle 57, instead of by the handle 56, the time period provided by the timing device for a toasting operation will be shorter and, consequently, the bread slice toasted during that operation will be toasted to a lighter degree.

From the above description, it will be clearly understood that I have provided a means for an automatic toaster, and particularly for toasters which are controlled for varying the time period in proportion to the heat thereof, whereby, after the said toaster has been permanently adjusted for the type of toast desired, either a light or a dark slice of toast may be obtained without disturbance of the said adjustment and without requiring any special operation other than to press either one or another of a plurality of manually operable members of said toasters.

As illustrated in the modification shown in Figure 8, I may, if desired, provide a means for adjusting the relation of the handles 56 and 57 in accordance with the difference desired between the light and dark slices of toast. This means may consist of an adjusting member, such as a screw 61, which is preferably threaded to and extends through the handle 56 to engage the handle 57 as clearly illustrated. This screw may have a suitable knurled head 62 whereby it may be turned to adjust the distance between the bar 23 and the extension 59 so that the difference between the setting of the time mechanism for light toast and the setting for dark toast may be varied in accordance with the difference desired between the said slices.

From the above description, and drawings, it will be clearly understood that, by my invention, I have provided a novel and useful means which can be applied to an automatic toaster for the purpose of selectively producing light and dark toast and which may be also applied to automatic toasters using various other types of timing or controlling mechanisms than those herein indicated. Further, my invention may also be applied to automatic toasters wherein the timing periods for the toasting operations are provided wholly, or partly, by the action of thermo-responsive means; all of which means, for the purpose of the present invention, are considered the equivalent of the timing means set forth in the appended claims.

While in my Patent No. 2,293,741 I have shown a similar invention for selectively winding a timing mechanism to a greater or lesser extent, for the purpose of eliminating the necessity of preheating a toaster which is is not controlled by a thermally responsive element; in the present invention, I employ the use of such means to a thermostatically controlled automatic toaster for selectively obtaining light and dark toast to suit the taste of different individuals.

I claim:

1. An automatic bread toaster comprising a heating element, a bread carrier movable to toasting and non-toasting positions relative to said element, timing means adapted to be selectively conditioned for providing periods of time of different durations to permit bread slices on said carrier to be toasted to different degrees, and a plurality of manually-operatable elements each operatable to cause movement of said bread carrier to toasting position and conditioning of said timing means for a different degree of toasting.

2. In an automatic bread toaster; heating means for toasting a bread slice, a bread carrier movable into toasting and non-toasting positions relative to said heating means, timing means for controlling a toasting operation and selectively adjustable to provide timed toasting periods of different durations, a plurality of manually controllable elements exterior of the toaster, and means interior of the toaster operable upon the operation of any one of said elements for moving said bread carrier to toasting position and adjusting said timing means to provide a period of time of selected duration for a toasting operation.

3. An automatic bread toaster comprising heating elements, a bread carrier movable into toasting and non-toasting positions relative to said elements, timing means adapted to be selectively conditioned for causing movement of said bread carrier to non-toasting position when bread slices on said carrier are toasted to different degrees, and a plurality of manually-operatable elements each independently operatable to cause movement of the bread carrier to toasting position and conditioning of the timing means for a different degree of toasting.

4. An automatic toaster of the character described comprising a heating element, means for positioning a bread slice to be toasted by heat from said heating element, means for terminating the toasting of a bread slice, a timing device for operating said terminating means, means for adjusting the said timing device to provide a predetermined period of time before the operation of said terminating means thereby and thermally responsive means for varying said period of time in proportion to the heat of the toaster; manually operable means for setting said terminating means and timing device to permit toasting of a bread slice to a certain degree, separate manually operable means for setting said terminating means and timing device to permit toasting of a bread slice to a greater degree, and adjusting means for affecting the operation of said first mentioned manually operable means to vary the difference in the degree of the toasting of said bread slices.

5. In combination with an automatic toaster comprising a heating element, means for controlling the operation of said heating element, timing means for operating said controlling means at the expiration of a pre-determined period of time and thermally responsive means for varying said period of time in proportion to the heat of the toaster; a stop in said toaster, setting means for setting said controlling means and timing means to provide said period of time of a duration depending upon the operation of said setting means as influenced by said stop; said setting means including a handle connected thereto for operating the same to set said controlling means and the timing device for terminating the toasting operation of said toaster at the expiration of a period of time during which a bread slice has been toasted to a certain degree, a handle for setting said controlling means and timing device for terminating the toasting operation at the expiration of a period of time during which a bread slice has been toasted to a different degree and adjusting means for varying the difference between said degrees of toasting.

6. In a device of the character described comprising timing means for terminating the operation thereof at the expiration of a period of time and means responsive to heat in said device for affecting the operation of said timing means to vary said period of time in response to variations in temperature in said device; a member for setting said timing means to provide said period of time, a stop for limiting the movement of said member, and separate means for operating the said member and engageable with said stop for limiting the movement of said member to set said timing means to provide a different period of time; said separate means being yieldable upon engagement with said stop to permit independent operation of the said setting member.

7. In a device of the character described comprising timing means for terminating the operation of said device at the expiration of a substantially pre-determined period of time, means responsive to heat in said device for affecting the operation of said timing means to vary said period of time in proportion to heat in said device; means including a member adapted to set said timing means to provide said period of time of a certain duration, a separate member movable upon the said first member and constantly in condition to be actuated for operating said first member to set said timing device for a shorter period of time, and means on said separate member for engaging the first member to move the same; said separate member being yieldable to permit independent operation of the said first member.

8. In a device of the character described, the combination of a timing mechanism for terminating the operation of said device at the expiration of one of substantially pre-determined periods of time of different durations depending upon the extent to which said timing mechanism is wound, means affecting the operation of said timing mechanism to vary the duration of said periods of time in response to temperature changes in said device, and means for winding the said timing mechanism to provide said periods of time; said winding means comprising at least two manually operable handles for selectively operating the same and a stop for limiting the movement of said winding means by either of said handles; the said winding means when operated by one of said handles being adapted to wind said timing mechanism to provide a period of time of a certain duration, and when operated by another of said handles to wind the said timing mechanism to provide a period of time of a different duration; each of said handles being constantly in condition to operate said winding means and at least one of said handles being yieldable upon engagement with said stop to permit independent operation of said winding means by another of said handles.

9. In a toaster of the character described comprising a variable speed timing device for terminating the toasting operation thereof upon the expiration of a period of time provided by said timing device, means for setting said timing device to operate at a predetermined rate of speed and thermally controlled means for varying the speed of said timing device in proportion to the heat of said toaster; a manually operable member for winding said timing device to operate for a period of time of a certain length and a separate manually operable member for winding said timing device to operate for a period of time of a different length.

10. In a toaster of the character described comprising a variable speed timing device for terminating the toasting operation thereof upon the expiration of a period of time provided by said timing device, means for setting said timing device to operate at a predetermined rate of speed, thermally controlled means for varying the speed of said timing device in proportion to the heat of said toaster and a manually operable member; a handle on said member whereby the same may be operated to set said timing device for terminating the toasting operation at the expiration of a certain period of time, a separate handle on said member for operating the same and means on said separate handle to cause said member to set said timing device to terminate a toasting operation at the expiration of a period of time of a different length when the said member is operated by said separate handle.

LOUIS V. LUCIA.